July 3, 1962 E. T. HALL ET AL 3,042,304

ADDER CIRCUIT

Filed June 30, 1959 2 Sheets-Sheet 1

INVENTORS
EDDIE T. HALL
JOHN D. NEWTON
JAMES R. WOOD

BY Edgar H. Kent
ATTORNEY.

July 3, 1962 E. T. HALL ET AL 3,042,304

ADDER CIRCUIT

Filed June 30, 1959 2 Sheets-Sheet 2

INVENTORS
EDDIE T. HALL
JOHN D. NEWTON
JAMES R. WOOD
BY Edgar H. Kent
ATTORNEY.

United States Patent Office 3,042,304

Patented July 3, 1962

3,042,304

ADDER CIRCUIT

Eddie T. Hall, Hopewell Junction, John D. Newton, Kingston, and James R. Wood, Poughkeepsie, N.Y., assignors to International Business Machines Corporation, New York, N.Y., a corporation of New York Filed June 30, 1959, Ser. No. 823,996

6 Claims. (Cl. 235—153)

Figure 1:
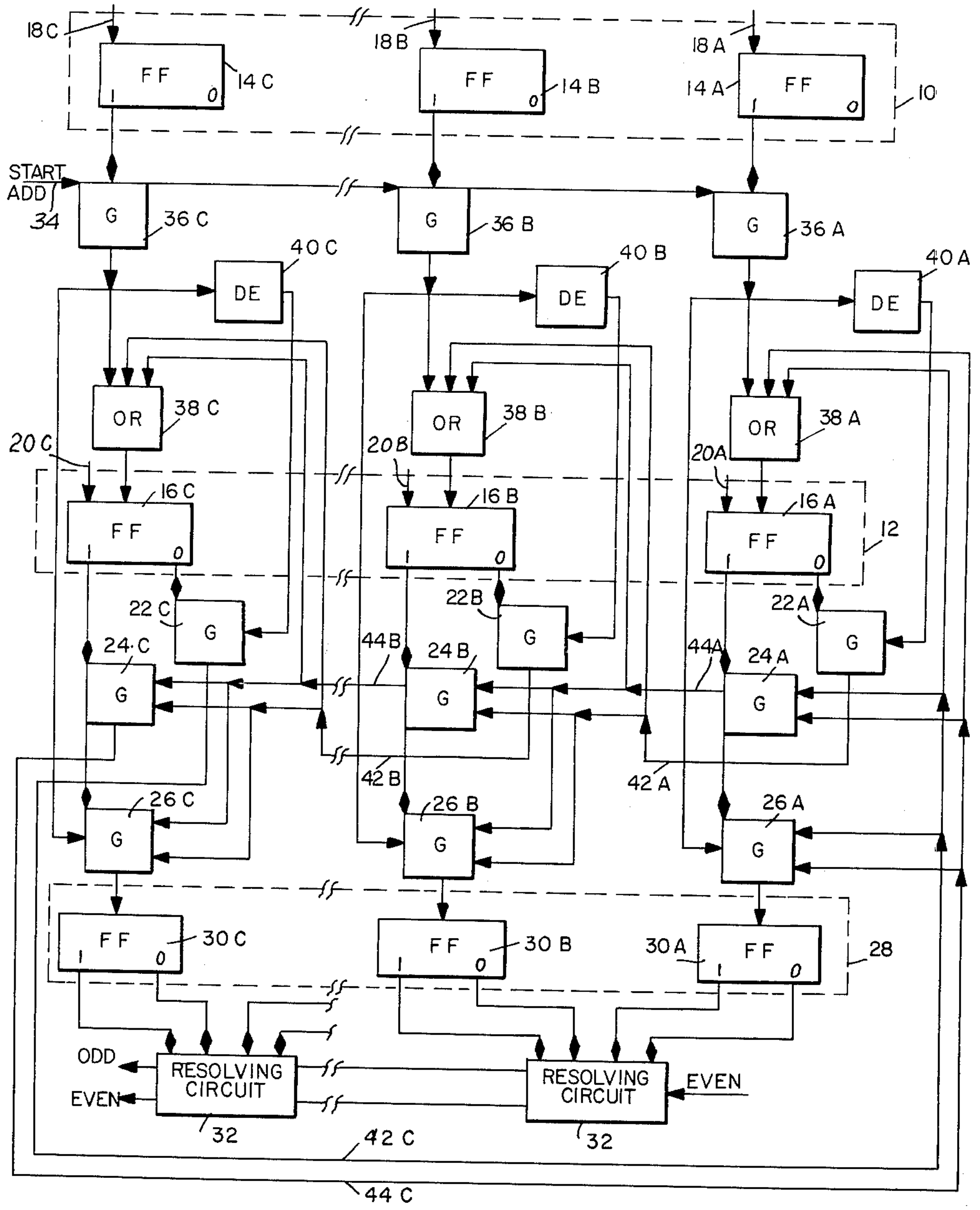

This invention relates generally to apparatus particularly adapted to perform arithmetic functions as typically required in electronic digital computer systems and more particularly to an improved arithmetic element and associated error detection apparatus designed for use in such systems.

Due to the complexity of and high rate of data processing available in many electronic digital computers it is generally necessary that such computer equipments incorporate elaborate and accurate checking circuitries for detecting malfunctions and indicating the causes thereof. Typically an error checking unit is associated with a plurality of components formed in a logical unit. The checking circuitry preferably should enable the detection of all possible errors that can occur. The parity type of checking circuit, which is frequently employed in binary systems, checks the sum of digits in a binary number, determines whether it is odd or even and compares that determination with a predetermined correct parity of the number. Where the comparison fails it is assumed that the logical unit improperly handled the number and an error signal is generated. The adder which is conventionally utilized to perform data manipulations in the arithmetic element of the computer and which may be used for other functions is such a logical unit and is susceptible to combination with a checking circuit.

Accordingly, it is an object of the invention to provide a high-speed adder circuit which is simple in construction and in operation and which facilitates error checking.

Another object of the invention is to provide a parity check arrangement in conjunction with an adder circuit that enables the detection of substantially all single failures of the circuit elements therein.

Still another object of the invention is to provide reliable adder circuitry that is arranged to perform high-speed arithmetic computations in digital computers operating in the binary mode and that is adapted to be associated with an error checking system of the parity type.

A further object of the invention is to provide an error detection system for a binary adder circuit which requires a minimum amount of equipment in addition to the components necessary to implement the arithmetic functions of the adder, and which is especially adapted from a reliability standpoint to check computations involving repetitive arithmetic processes carried out at high speeds.

The preferred embodiment of the invention includes the combination of a high-speed parallel type adder circuit which utilizes both parallel and serial carry generation principles and a checking circuitry associated with the adder which permits substantially complete detection of single failures by means of parity checking schemes. The adder includes an addend register and an augend register, which ultimately contains the sum, each containing a corresponding number of bistable devices. The addend stored in the addend register is transferred in parallel fashion to the augend register and added to the augend stored therein in a half add operation. Pulses generated during this transfer but delayed to permit resolution of the bistable devices subsequently generate the requisite carry pulses which may propagate through the augend register loop only once at most. The checking circuitry senses the number of carries generated and establishes the parity of this number, adds it to the sum of the pre-established parities of the addend and augend and compares the resultant sum of the parities with the clarity of the sum held in the augend register at the completion of the addition. If the resultant parities do not compare an error signal is generated.

The adder as compared with D.C. resolving types of adders is marked by its simplicity and economy from the viewpoint of logic and further the effective add time is faster than obtainable under comparable conditions with other types of binary adders. The checking circuit enables determination of substantially all single failures. Thus this adder arrangement provides a logical device having extremely high reliability and enabling accurate error detection in a simple and economical high-speed binary adder circuit.

Figure 2:
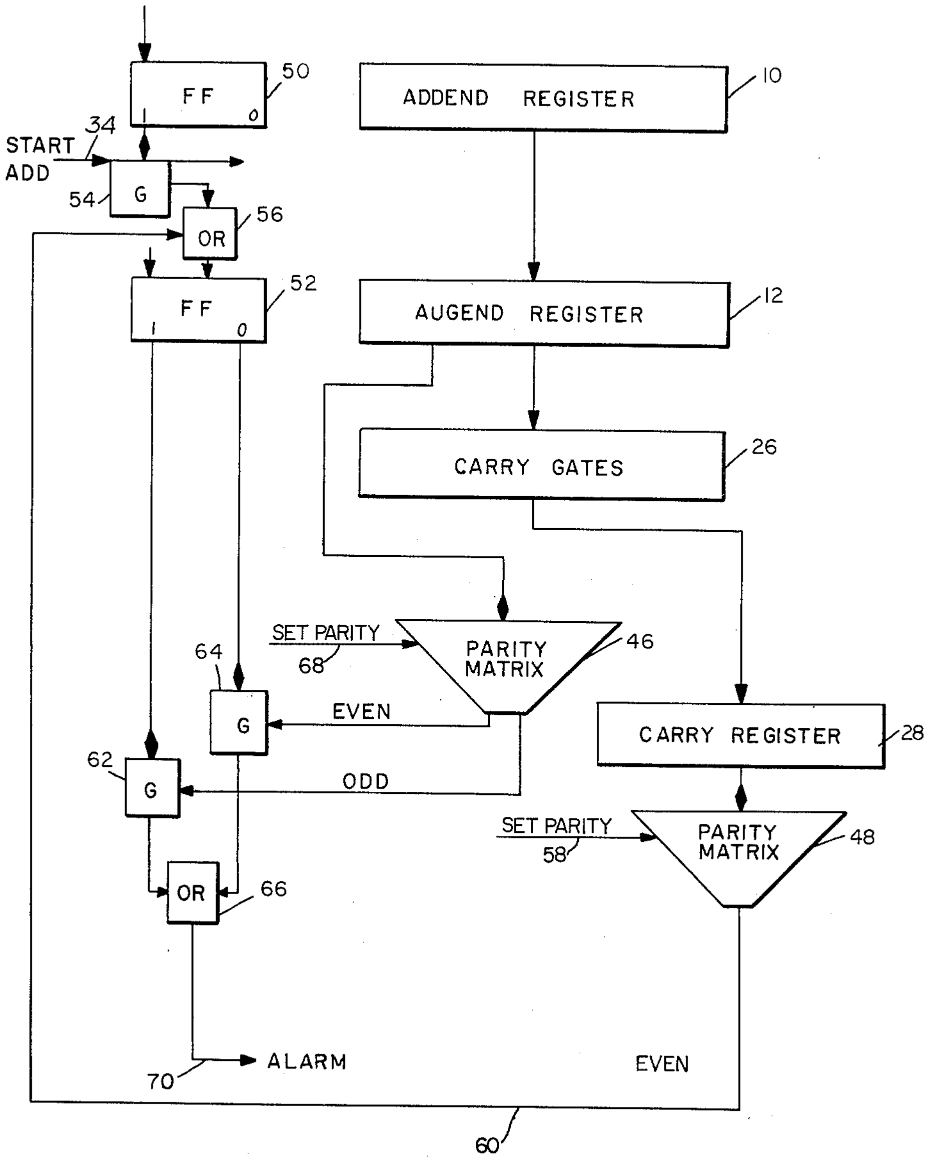

Other objects and advantages of the invention will be seen as the following description of a preferred embodiment of the invention progresses in conjunction with the drawings, in which:

FIG. 1 is a logical diagram of the adder circuitry and a portion of the checking circuitry utilized in the preferred embodiment of the invention; and FIG. 2 is a block diagram illustrating the principles of the parity checking circuitry associated with the adder of FIG. 1.

Throughout the following description and in the accompanying drawings there are certain conventions employed which are familiar to certain of those skilled in the art. Additional information concerning those conventions is as follows:

In the block diagram figures of the drawing a conventional filled-in arrowhead is employed on lines throughout the drawing to indicate (1) a circuit connection (2) energization with a pulse and (3) the direction of pulse travel which is also the direction of control. A diamond-shaped arrowhead indicates (1) a circuit connection and (2) energization with a D.C. level. Bold face character symbols appearing within a block symbol identify the common name for the circuit represented, that is, FF identifies a flip-flop, G a gate circuit, OR a logical OR circuit, and so forth. A variety of circuits for the performance of each of these functions is known in the art.

The adder circuitry shown in FIG. 1 includes an addend register 10, and an augend register 12. In that circuitry only three stages, A, B and C are indicated. It will be understood that the adder may be readily expanded to the desired number of stages in a straightforward manner by utilizing the requisite numbers of additional similar stages. The addend register includes flip-flops 14A, 14B and 14C and the augend register includes flip-flops 16A, 16B and 16C. The binary number representing the addend is placed in the addend register 10 by selectively pulsing the One input lines 18 to set the flip-flops of the addend register to the values of the corresponding bits and the augend is placed in the augend register 12 in like manner by selectively pulsing the One input lines 20 to set the flip-flops of that register.

Associated with the adder are two sets of carry gates 22A, 22B, 22C and 24A, 24B, 24C, a set of carry count gates 26A, 26B, 26C and a carry register 28 which includes flip-flops 30A, 30B and 30C. Switching circuits 32 of the type disclosed in the copending application Serial Number 784,281, filed in the name of Joseph J. Moyer on December 31, 1958 are utilized to provide a parity of the carry register in the manner described in that application.

In operation, the addition process is initiated by a start add pulse on line 34 which samples gates 36A, 36B, 36C and the pulse passes through those gates which are conditioned by the associated flip-flops 14 of the addend register that are set to the One state. A resultant pulse passes through the associated OR circuit 38 and complements the associated flip-flop 16 of the addend register 12. This results in the completion of a half add and the addend register 10 may be cleared for future use if desired.

The pulses passed by gates 36 are also applied to each carry count gate 26 of the associated stage. That gate is conditioned by the One level from the associated augend register flip-flop 16, and if conditioned a pulse is passed, indicating that both the addend register flip-flop 14 and the augend register flip-flop 16 contained binary One and that a carry is to be generated. This fact is recorded by complementing the associated flip-flop 30 in the carry register 28.

The carry is initiated by the pulse from gate 36 which is also passed through a delay unit 40 of sufficient duration to permit the flip-flop to resolve after it has been complemented. In the preferred embodiment this delay is 80 millimicroseconds. The delayed pulse then samples the slow carry gate 22 which is conditioned by the Zero output of the associated augend register flip-flop 16. It will be noted that this gate is conditioned and sampled only if both the addend and augend contained the binary One value in this stage. If the slow carry gate 22 is conditioned a carry pulse is passed on line 42 through the OR circuit 38 of the next higher stage to complement the flip-flop 16 of that stage and samples the fast carry gate 24 and the carry count gate 26 of that higher stage. If the flip-flop 16 was in the One state both gates will be conditioned when sampled (before the complementing input removes the conditioning level.) The fast carry gate passes the carry pulse on line 44 to the next stage and the carry count gate passes the carry pulse to complement the carry register flip-flop. The augend flip-flop is also cleared to Zero.

This fast carry will propagate in similar fashion through the adder chain until an augend flip-flop containing a Zero is reached. That flip-flop will be then complemented to the One state and the carry propagation will terminate. The slow and fast carry pulses from the highest stage (C) are connected in loop fashion back to the lowest stage (A) on lines 42C and 44C respectively. In the worst case from a standpoint of the time necessary to complete the addition a serial fast carry can propagate through the entire adder chain but in the normal case several serial carries will be generated at the same time. No stage can generate or pass more than one carry per addition process and thus if more than one serial carry is generated at the same time the duration of the carry propagation will be substantially reduced. This is also true whenever certain of the stages of the addend register which ultimately contains the sum are set to Zero as a result of the half add process.

The maximum total time required by this adder to perform an addition is the sum of (1) the gate delay in the addend transfer (10 millimicroseconds in the preferred embodiment), (2) the flip-flop resolving time (80 millimicroseconds), (3) the carry gate delay (10 millimicroseconds per stage) and (4) the final augend flip-flop resolving time (80 millimicroseconds). When the addition is complete the augend register contains the correct sum provided no errors were made.

Errors are detected by generating the parity of the final sum by a matrix of the same type that is used to determine the parity of the carries as described above and comparing that parity with the summation of the parities of the augend, the addend, and the carries. A block schematic of this error detection circuitry is shown in FIG. 2.

The parity matrices 46 and 48 are associated with the augend register 12 and the carry register 28 respectively. The parity matrix 46 provides the parity of the sum contained in the augend register as a result of the addition and the parity matrix 48 provides the parity of the aggregate of the carries. As indicated above these matrices in the preferred embodiment utilize the parity checking elements disclosed in the copending application Serial No. 784,281, filed in the name of Joseph J. Moyer on December 31, 1958 and entitled Switching Circuit.

The parity of the addend is indicated by the status of the parity flip-flop 50 associated with the addend register 10 and the parity of the augend is indicated by the status of the parity flip-flop 52 associated with the augend register 12. These flip-flops are set by the parity bit associated with each binary number at the same time as that value is transferred into the adder registers. The start add pulse on line 34 samples gate 54 and transfers the parity value of the addend to the augend parity flip-flop 52 through OR circuit 56 in an add operation, complementing flip-flop 52 whenever flip-flop 50 contains a one.

The parity of the aggregate of the carries is established by parity matrix 48 as a result of a set parity pulse on line 58. If the number of carries is even a pulse is applied on line 60 to the complement input of the augend register parity flip-flop 52 to complement that flip-flop effectively adding the parity of the carries to the sum of the parities of the addend and augend. Thus, the condition of the augend register parity flip-flop 52 indicates the sum of the parities of the addend and the augend, and the carries. Its resultant output is applied to either gate 62 or gate 64. A set parity pulse is applied to matrix 46 on line 68 and the resultant output is applied to gate 62 or gate 64. That output samples gate 62 if the output of parity matrix 46 indicates the parity of the sum is odd while gate 64 is sampled if the output of parity matrix 46 indicates the parity of the sum is even. Thus neither gate passes a pulse if the parity indicated by matrix 46 agrees with the sum of parities indicated by flip-flop 52. If there is disagreement one gate will pass a pulse through OR circuit 66 and on line 70 as an alarm signal.

This checking circuit will detect all single failures of the adder components except certain errors due to a solid failure of the augend flip-flop. However, subsequent operation of the adder will enable detection of that failure. The use of parity circuits are based on the principle that any failure will be detected where an odd number of errors occur. The associated adder circuitry is designed such that an odd number of errors is produced for any single failure.

The following list is representative of the possible types of component failure:

(1) Addend flip-flop 14 failure.
   One error (2) Addend gate 36 fails closed when the augend bit is zero.
   Augend flip-flop 16 does not complement—
   One error (3) Addend gate 36 fails closed when the augend bit is one.
   Augend flip-flop 16 will not complement, no carry from the slow carry gate 22 will be generated and no carry will be recorded—
   Three errors (4) Addend gate 36 fails open and augend bit is zero.
   Augend flip-flop 16 will complement—
   One error (5) Addend gate 36 fails open and augend bit is one.
Augend flip-flop 16 will complement, carry will be recorded and carry from carry gate 22 will be generated—
Three errors (6) Either carry gate 22, 24 fails open (and next higher augend bit is zero).
Augend flip-flop 16 will complement—
One error (7) Either carry gate 22, 24 fails open and the next higher augend bit is one.
Augend flip-flop 16 will complement, carry will be generated and recorded—
Three errors (8) Either carry gate 22, 24 fails closed and next higher augend bit is zero.
Augend flip-flop 16 will not complement—
One error (9) Either carry gate 22, 24 fails closed and the next higher augend bit is one.
Augend flip-flop 16 will not complement, carry will not be generated nor recorded.

(10) Carry count gate 26 fails closed.
A carry can be generated by or propagate past only one bit—
One error

(11) Carry count gate 26 fails open.
A count where there is a carry is not an error.
One error at most due to the generation of a slow carry and a subsequent fast carry.

(12) Carry register flip-flop failure.
One error

Thus the use of this error detection circuitry with the pulse type adder above described enables the detection of substantially all errors resulting from a single failure of any logical component and the detection of any other errors is achieved upon subsequent operation of the circuitry.

It will be understood that this adder and check circuitry may assume various other circuit configurations within the principles of the invention depending upon outside factors such as equipment, cost, and necessary circuit speed. For example, due to timing problems, it may be possible that a carry count gate may be sensed at a slightly higher rate than the resolution time of a flip-flop. Should this occur the carry count gate 26 may be replaced by two gates, one being sampled by the slow carry initiating pulse and the other being sampled by the fast carries. Also as shown in FIG. 1 a delay unit 40 is associated with each stage. This circuitry may be modified by providing a single delay unit associated with the Start Add line 34 and the provision of an additional gate on the One side of each addend flip-flop 14 that is sampled by the output of that delay unit for controlling the generation of the slow carry gate sampling pulse.

The circuitries utilized in this embodiment are of types well known in the art. In the preferred embodiment the flip-flops are the type disclosed in copending application Serial Number 822,793 entitled High Speed Multivibrator, filed in the name of John W. Skerritt on June 25, 1959; the gates are the type disclosed in copending application Serial Number 784,210, filed in the name of Robert W. Averyt et al. on December 31, 1958; and the OR circuits are conventional pulse type diode OR circuits.

Although a preferred embodiment of the invention has been shown and described, it will be understood that the invention is not limited thereto or to details thereof and departures may be made therefore within the spirit and scope of the invention as defined in the claims.

We claim:

1. A binary adder circuit having a plurality of stages, comprising an addend register and an augend register, each register having a bistable device corresponding to each said stage, means to store a binary number including a parity indication in each said register, means adapted to transfer signals representative of one of said numbers to the other register to produce a half add result, means for delaying and then applying said transferred signals to sample said half add result and to generate carries in accordance therewith for completing the binary addition process and storing the resultant sum in said other register, and error checking circuitry associated with said adder including means for determining the parity of the aggregate of said carries, summing means for adding that parity to the sum of the parities of the augend and addend and means for comparing the output of said summing means with the parity of the sum stored in said other register.

2. A binary adder circuit having a plurality of stages, an addend register and an augend register each register having a corresponding number of bistable devices, means to store a binary number in each said register and means to store the parity of each of said numbers, pulse means for applying signals to said augend register in accordance with the values stored in said addend register to complement certain of the bistable devices in said augend register in a half add operation, means to delay said addend value signals for sampling the output of each bistable device in the said augend register after said certain devices have been complemented, said delayed signals being adapted to initiate the generation of carries, said carries being adapted to complement certain stages of the augend register so that register contains the sum of the numbers previously held in the augend and addend registers, means for determining the parity of the aggregate of the carries, summing means for adding that parity to the parity of the addend and the augend and means for comparing the output of said summing means with the parity of the sum stored in the augend register.

3. The adder circuit as claimed in claim 2 wherein said summing means includes a flip-flop adapted to store the parity of one of said numbers and means responsive to the parity of the other number adapted to affect the state of said flip-flop so that it indicates the sum of said parities, and said carry parity determining means has an output coupled to said flip-flop, said output being adapted to affect the state of said flip-flop so that the resultant state of said flip-flop is indicative of the sum of the parities of the augend, addend, and carries.

4. The binary adder as claimed in claim 2 wherein said carry parity determining means includes a bistable device associated with each stage, means for complementing said bistable device each time a carry pulse is applied to the associated stage, and means for sampling the output of said carry indicating bi-stable devices for determining the parity of the aggregate of the carries.

5. A binary adder circuit having a plurality of stages comprising a first register and a second register, each register having a flip-flop associated with each stage and each flip-flop having a Zero side and a One side, means to store a binary number and its parity indication in each register, pulst means for applying signals to said second register in accordance with the binary values stored in said first register to complement certain of said flip-flops in said second register in a half add operation, means to effectively delay each complementing pulse and to apply said delayed pulse to sample the Zero side of the associated second register flip-flop for generating a carry signal, means to apply each carry signal to the next more significant stage of the second register to simultaneously sample the One side of the associated flip-flop and to complement that flip-flop so that said second register ultimately contains the sum of the numbers previously held in said first and second registers, means for generating the parity of the aggregate of the carries produced in the addition operation, summing means for adding that parity to the sum of the parities of said number and means for comparing the output of said summing means with the parity of the sum stored in said second register.

6. The adder as claimed in claim 5 wherein said parity generating means includes a gate associated with each stage of said adder conditioned by an output signal from the One side of the associated second register flip-flop, a carry summing flip-flop associated with each gate, said gate being adapted when conditioned to pass a pulse to complement said carry from a flip-flop, the output of said carry summing flip-flops being indicative of the parity of the aggregate of the carries produced in the addition operation.

References Cited in the file of this patent

UNITED STATES PATENTS 2,634,052 Bloch ------------------ Apr. 7, 1953

OTHER REFERENCES

Richards: Arithmetic Operations in Digital Computers (D. Van Nostrand Co., Inc., New Jersey, 1955), page 104 relied on. (Copy in Div. 23.)